United States Patent Office 3,497,571
Patented Feb. 24, 1970

3,497,571
ACRYLIC ESTER-CYCLIC ESTER ELASTOMERIC COMPOSITIONS
Pierre Tellier and Edouard Grimaud, Oullins, France, assignors to Ugine Kuhlmann, Paris, France, a company of France
No Drawing. Filed Dec. 12, 1967, Ser. No. 689,757
Claims priority, application France, Dec. 13, 1966, 87,168
Int. Cl. C08f 19/00
U.S. Cl. 260—844                              9 Claims

ABSTRACT OF THE DISCLOSURE

A vulcanizable elastomeric composition is prepared by copolymerizing (a) about 60% to 99% by weight of at least one acrylic ester of an aliphatic alcohol, (b) about 1% to 10% by weight of at least one cyclic ester which has the general formula as follows:

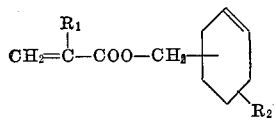

wherein $R_1$ and $R_2$ each is a hydrogen atom or a methyl radical and (c) up to about 30% by weight of at least one monomer which is capable of copolymerizing with (a) and (b), such as acrylonitrile. The moiety of the aliphatic alcohol in the acrylic ester of (a) contains 1 to 8 carbon atoms. The polymeric composition is vulcanizable in a conventional manner such as by crosslinking in the presence of sulfur and accelerators.

BACKGROUND OF THE INVENTION

Field of the invention

This invention relates to vulcanizable acrylic elastomeric compositions and vulcanized products therefrom.

Description of the prior art

Acrylic elastomers which are rubbery products containing predominant amounts of acrylic esters are well known. They possess good resistance to heat and a satisfactory resistance to oils, but their mechanical properties are poor. Vulcanizing prior acrylic elastomers is often difficult. Heretofore, introduction of reactive groups onto the molecules of the chain to facilitate vulcanization has been used. Among the reactive groups that have been introduced onto the acrylic elastomers to improve vulcanization are halogen atoms and epoxy groups. The halogenated and the epoxidized acrylic elastomers, however, have not been completely satisfactory due to the tendency of the former to corrode the steel molds commonly used in manufacturing molded articles from acrylic elastomers and the tendency of the latter to stick to the molds which results in fouling thereof.

SUMMARY OF THE INVENTION

The present invention provides an acrylic vulcanizable elastomeric composition having therein unsaturated bonds $$>C=C<$$

which render the acrylic elastomer of this invention suitable for vulcanization with well known vulcanizing systems for crosslinking double bonds. The resultant vulcanized products of this invention have excellent mechanical properties and good resistance to heat and to hot oils, and are particularly suitable for use as special-purpose rubbers.

Broadly stated, the vulcanizable elastomeric composition of this invention comprises copolymer of (a) about 60% to 99% by weight of at least one acrylic ester of an aliphatic alcohol, (b) 1% to about 10% by weight of at least one acrylic ester of the general formula:

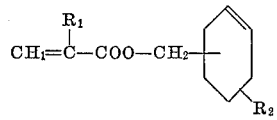

wherein $R_1$ and $R_2$ each is a hydrogen atom or a methyl group, and (c) up to about 30% by weight of at least one monomer being copolymerizable with (a) and (b). The moiety of the aliphatic alcohol in the ester of (a) contains, preferably, 1 to 8 carbon atoms.

DESCRIPTION OF THE PREFERRED EMBODIMENT

The vulcanizable acrylic elastomeric composition of this invention is prepared by copolymerizing (a) at least one acrylic ester with (b) at least one ester of the type having the following general formula

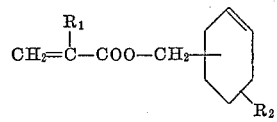

wherein $R_1$ and $R_2$ each is a hydrogen atom or a methyl group and optionally with (c) up to 30% by weight of one or more copolymerizable monomers. The acrylic esters that can be used as the (a) component of the composition are those derived from aliphatic alcohol containing 1 to 8 carbon atoms. Among the esters, we found methyl, ethyl, butyl, 2-ethylhexyl and heptyl acrylates to be eminently suitable. The preferred esters of the (b) component are 3-cyclohexen-1-ylmethyl-acrylate and 3-cyclohexen-1-ylmethyl-methacrylate. The amount of the cyclic ester or esters that can be used is 1% to 10% by weight of the final polymeric composition. Preferably the range is between 2% and 8% by weight. The cyclic esters may be obtained, according to F. C. Frostick, Jr. et al. (J. Am. Chem. Soc., 81, 3350, 1959) from 3-cyclo-hexenemethanol and excess methyl acrylate or methacrylate with an acidic catalysator and an inhibitor.

In addition to the components (a) and (b), one or more copolymerizable monomers may be used in combination therewith to form the acrylic elastomers. A number of monomers are known to copolymerize with the acrylic esters and the cyclic esters used in the vulnaizable composition of this invention. The suitable ones include acrylonitrile, methacrylonitrile, methylene glutaronitrile, styrene, esters of saturated aliphatic alcohol containing 1 to 18 carbon atoms, vinyl alkyl ethers whose alkyl radicals such as methyl, ethyl, n-butyl, and isobutyl contain 1 to 18 carbon atoms, allyl acrylate, allyl methacrylate and divinyl benzene. The amount of the (c) component that can be used is from 0 to 30% by weight of the elastomeric composition.

The vulcanizable elastomeric composition of this invention may be prepared by copolymerization of the various monomeric components using any one of many well known techniques for copolymerizing acrylic elastomers. We found emulsion or suspension copolymerization at a temperature in the range between 0° and 100° C. produces particularly good results.

The acrylic elastomer thus obtained contains double bonds and is suitable for vulcanization by conventional techniques which include crosslinking (a) under the influence of sulfur or sulfur releasing compounds and organic accelerators; (b) with methylolphenol resins, particularly the halogenated phenolic resins; and (c) in the presence of quinone dioximes. Vulcanization may also be effected with organic or inorganic peroxides. In general, we prefer to use the vulcanization systems which are suitable for crosslinking rubbers of the type comprising isobutylene and isoprene (butyl rubber) and of the terpolymers comprising ethylene, propylene and a dienic hydrocarbon. The selection of the formula for vulcanization depends, however, upon the final properties required. We found the systems using sulfur and accelerators are particularly advantageous for vulcanizing the acrylic elastomers of this invention. The thus vulcanized products have excellent mechanical properties and resistance to heat and oil, in particular, the oils containing additives (such as sulfur bearing additives) commonly used in the automobile industry.

Further to illustrate this invention, specific examples are described hereinbelow. Examples 1 to 3 pertain to the preparation of acrylic elastomers of this invention and Examples 4 to 6 describe a few possible processes of vulcanization.

EXAMPLE 1

Emulsion copolymerization of ethyl acrylate and 3-cyclohexen-1-ylmethyl acrylate The copolymer was prepared from the following starting materials:

| | Grams |
|---|---|
| Ethyl acrylate | 384 |
| 3-cyclohexen-1-ylmethyl acrylate | 16 |
| Water | 560 |
| Lauryl sulfate of sodium | 4 |
| Monosodium phosphate monohydrate | 2 |
| Potassium persulfate | 0.24 |
| Sodium bisulfite | 0.12 |
| Ferrous sulfate heptahydrate | 0.016 |

345 cc. of water and the total amount of monosodium phosphate were introduced into a 2 liter flask (held at 20° C.) which was provided with a stirring device, with two funnels, with means for introducing nitrogen and with means for measuring the temperature. The funnels were filled, one with the monomers and the other with a solution of 4 grams of sodium lauryl sulfate in 200 cc. of water. After purging the vessel with a current of nitrogen, 30 cc. of the lauryl sulfate solution were run in, then the persulfate, bisulfite, and ferrous sulfate were added, each in the form of 5 cc. freshly prepared solution. Immediately thereafter, the monomers and the rest of the lauryl sulfate solution were added into the flask simultaneously and continuously, at a speed such that the internal temperature of the flask, which tends to rise rapidly, was maintained at 25° C. The addition lasted approximately 1½ hours and the vessel was held thereafter at 25° C. for 3 more hours. The yield of copolymerization at the end of the 3 hours was 98.5%.

The dispersion so obtained was coagulated with an aqueous 0.5% by weight solution of calcium chloride. The polymer was recovered in the form of white particles which were carefully washed with water, drained and dried under reduced pressure at 60° C. The polymer was only partially soluble in benzene.

EXAMPLE 2

Emulsion copolymerization of a terpolymer of butyl acrylate, acrylonitrile and 3-cyclohexen-1-ylmethyl acrylate Following the mode of operation described in Example 1, there was prepared a copolymer of:

| | Grams |
|---|---|
| A—Butyl acrylate | 336 |
| B—3-cyclohexen-1-ylmethyl acrylate | 16 |
| C—Acrylonitrile | 48 |

After isolation, the elastomer was obtained in the form of white particles.

EXAMPLE 3

Suspension copolymerization of ethyl acrylate and 3-cyclohexen-1-ylmethyl methacrylate.

The following solution was introduced into a 2-liter flask having a stirring mechanism and input lines for nitrogen and a refrigerant:

| | Grams |
|---|---|
| Water | 800 |
| Polyvinyl alcohol | 0.4 |

(The polyvinyl alcohol was in the form of Rhodoviol HS 100 supplied by Rhone-Poulenc.)

The solution was heated to 70° C. and was deaerated by bubbling nitrogen through it. There was then introduced, with stirring, the following mixture:

| | Grams |
|---|---|
| Ethyl acrylate | 388 |
| 3-cyclohexen-1-ylmethyl methacrylate | 12 |
| Lauroyl peroxide | 0.4 |

After 8 hours, the polymerization was substantially complete and the copolymer was isolated in the form of beads of about 0.2 mm. diameter. These were washed in water and dried at 60° C. at reduced pressure. The copolymer then had the form of a white agglomerate.

EXAMPLE 4

The acrylic elastomers from Examples 1, 2 and 3 will now be denoted X, Y, and Z respectively. From these elastomers there were prepared the following mixtures, the proportions of the constituents being in parts by weight.

TABLE I

| | X | Y | Z |
|---|---|---|---|
| Elastomer | 100 | 100 | 100 |
| MPC carbon black (medium processing channel) | 40 | 40 | 40 |
| Stearic acid | 1.5 | 3 | 3 |
| Zinc oxide | 10 | 0 | 0 |
| Sulfur | 2 | 2 | 2 |
| 2,2'-dithiobis benzothiazole | 0.5 | 0.5 | 0.5 |
| Tetramethylthiuram disulfide | 1 | 1 | 1 |
| N-phenyl-2-naphthylamine | 1.7 | 0 | 0 |

These various mixtures were vulcanized in a rubber press for 40 minutes at 153° C. and were then reheated to 150° C. for 24 hours. The plates or sheets so obtained had good surface quality. The mechanical properties measured on test pieces cut from those sheets are set forth in the following table:

TABLE II

| | X | Y | Z |
|---|---|---|---|
| 100% modulus in bars (i.e. tensile stress for a 100% elongation) | 44.6 | 19.6 | 23.5 |
| Tensile strength | 168 | 110 | 170 |
| Ultimate elongation | 327 | 262 | 325 |
| Shore A hardness | 77 | 60 | 71 |

EXAMPLE 5

Vulcanization with a resin base system employing resins of halogenated dimethylolphenol type The elastomer of Example 1 was used to prepare the following mixture:

| | Parts by weight |
|---|---|
| Elastomer X | 100 |
| MPC carbon black | 40 |
| Stearic acid | 1.5 |
| Zinc oxide | 5 |
| Schenectady 1055 Resin | 8 |

Schenectady 1055 Resin is a brominated dimethylolphenol resin. The mixture was vulcanized in a press for 45 minutes at 160° C. and was then reheated for 16 hours at 150° C. The following properties were measured on the vulcanized product.

| | | |
|---|---|---|
| 100% modulus | bars | 38.6 |
| Tensile strength | do | 121 |
| Ultimate elongation | percent | 300 |
| Shore A hardness | | 72 |

EXAMPLE 6

Vulcanization by peroxides

The elastomer X of Example 1 was used to prepare the following mixture:

| | Parts by weight |
|---|---|
| Elastomer X | 100 |
| F.E.F. Carbon Black (fast extrusion furnace) | 40 |
| Stearic acid | 1 |
| Dicumyl peroxide | 1.6 |
| Benzoyl peroxide | 0.5 |

This mixture was vulcanized under pressure at 135° C. for 40 minutes and was then reheated for 24 hours at 150° C. The vulcanized product obtained exhibited the following properties:

| | | |
|---|---|---|
| 100% modulus | bars | 16.8 |
| Tensile strength | do | 85 |
| Ultimate elongation | percent | 437 |
| Shore A hardness | | 69 |

We claim:

1. A vulcanizable elastomeric composition comprising copolymer of (a) about 60% to 99% by weight of at least one acrylic ester of an aliphatic alcohol, said alcohol having 1 to 8 carbon atoms, (b) about 1% to 10% by weight of at least one ester having the formula:

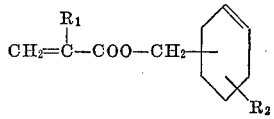

wherein $R_1$ and $R_2$ each represents a hydrogen atom or a methyl group, and (c) up to about 30% by weight of at least one monomer being copolymerizable with (a) and (b).

2. A vulcanizable elastomeric composition of claim 1 wherein the aliphatic alcohol is methyl, ethyl, butyl, 2-ethylhexyl, or heptyl alcohol.

3. A vulcanizable elastomeric composition of claim 1 wherein (b) is 3-cyclohexen-1-ylmethyl acrylate or 3-cyclohexen-1-ylmethyl methacrylate.

4. A vulcanizable elastomeric composition of claim 2 wherein (c) comprises at least one of the group consisting of acrylonitrile, methacrylonitrile, methylene glutaronitrile, styrene, esters of saturated aliphatic alcohol containing 1 to 18 carbon atoms, vinyl alkyl ethers whose alkyl radical contains 1 to 18 carbon atoms, allyl acrylate, allylmethacrylate and divinyl benzene.

5. A vulcanizable elastomeric composition of claim 4 wherein the amount of (b) in the composition is in the range between 2% and 8% by weight.

6. A vulcanizable elastomeric composition of claim 1 wherein (a) is the acrylate ester of methyl, ethyl, butyl, 2 ethylhexyl or heptylalcohol, (b) is 3-cyclohexen-1-ylmethyl acrylate or 3-cyclohexen-1-ylmethyl methacrylate in an amount between 2% and 8% by weight and (c) is acrylonitrile.

7. A vulcanizate comprising a sulfur crosslinked elastomeric composition of claim 1.

8. A vulcanizate comprising a methylolphenol resin crosslinked elastomeric composition of claim 1.

9. A vulcanizate comprising a peroxide crosslinked elastomeric composition of claim 1.

References Cited

UNITED STATES PATENTS 3,255,163  6/1966  Gobran et al. _____ 260—86.1

JOSEPH L. SCHOFER, Primary Examiner

C. A. HENDERSON, JR., Assistant Examiner

U.S. Cl. X.R.

260—23, 41, 45.9, 79.5, 80.6, 80.76, 80.81, 86.1, 785, 793

PO-1050
(5/69)

UNITED STATES PATENT OFFICE
CERTIFICATE OF CORRECTION

Patent No. 3,497,571               Dated   February 24, 1970

Inventor(s)   Pierre Tellier and Edouard Grimaud

It is certified that error appears in the above-identified patent and that said Letters Patent are hereby corrected as shown below:

Column 4, line 43, "1.7" should read --1.5--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents